UNITED STATES PATENT OFFICE.

FREDERICK ARCHER HANKS, OF NUNHEAD, LONDON, ENGLAND.

WIND-GAGE OR ANEMOMETER.

1,236,296.  Specification of Letters Patent.  Patented Aug. 7, 1917.

Application filed April 26, 1917. Serial No. 164,798.

*To all whom it may concern:*

Be it known that I, FREDERICK ARCHER HANKS, a subject of His Majesty the King of England, and resident of Nunhead, in the county of London, Kingdom of England, have invented certain new and useful Improvements in Wind-Gages or Anemometers, of which the following is a specification.

This invention relates to improvements in wind gages or anemometers of the kind used in connection with guns and rifles and in which a hanging flap or member coöperates with a curved and graduated tail piece mounted to turn under the influence of the wind about a vertical axis.

The present invention consists in the improved construction, arrangement and combination of parts hereinafter described and according to which the improved device is adapted to indicate the strength and direction of the wind and the exact amount of deflection for any target, i. e., for different ranges for the same gun or rifle.

The invention is hereinafter described with reference to the accompanying drawings, in which:—

Figure 1:
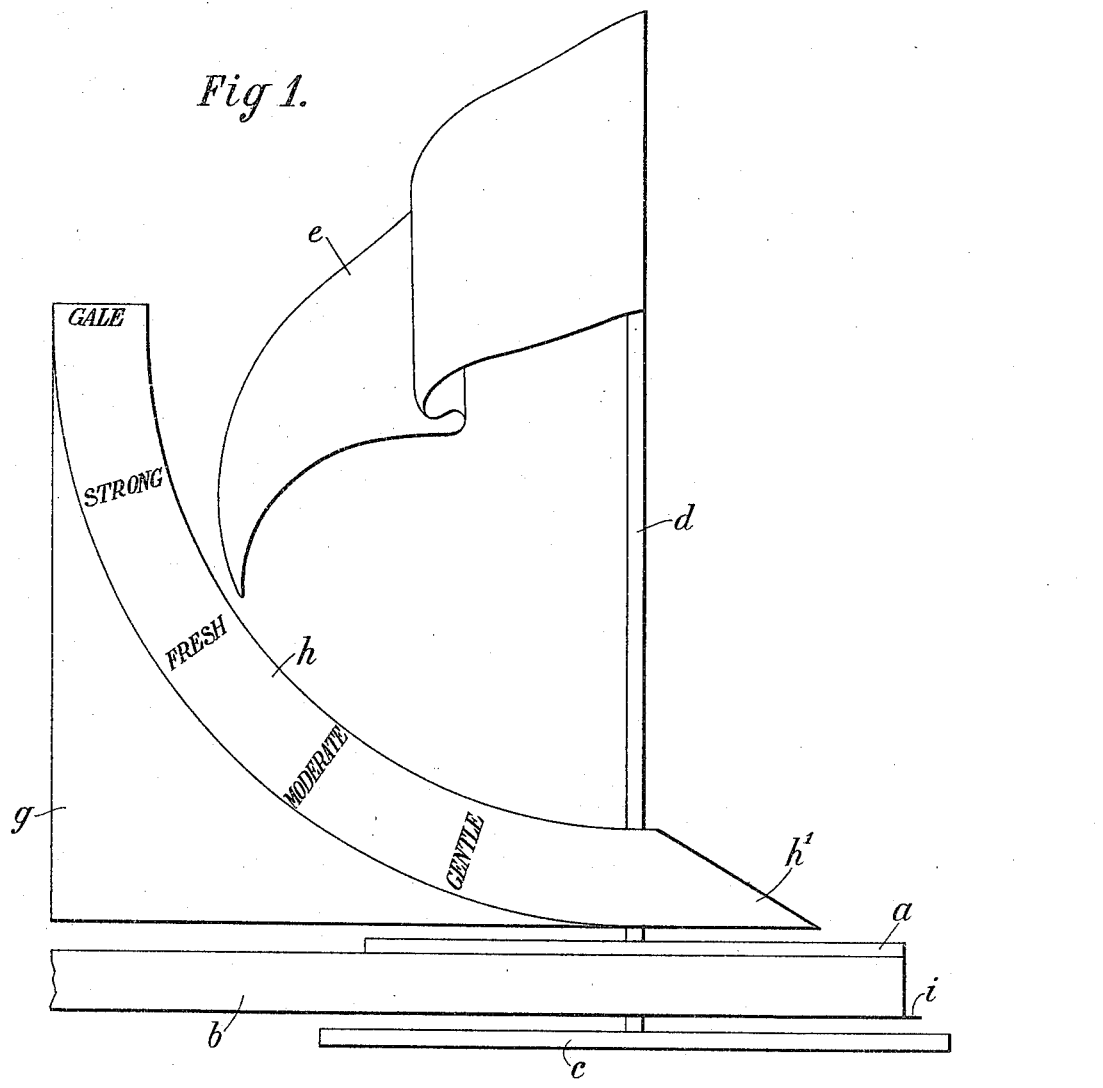
Figure 2:
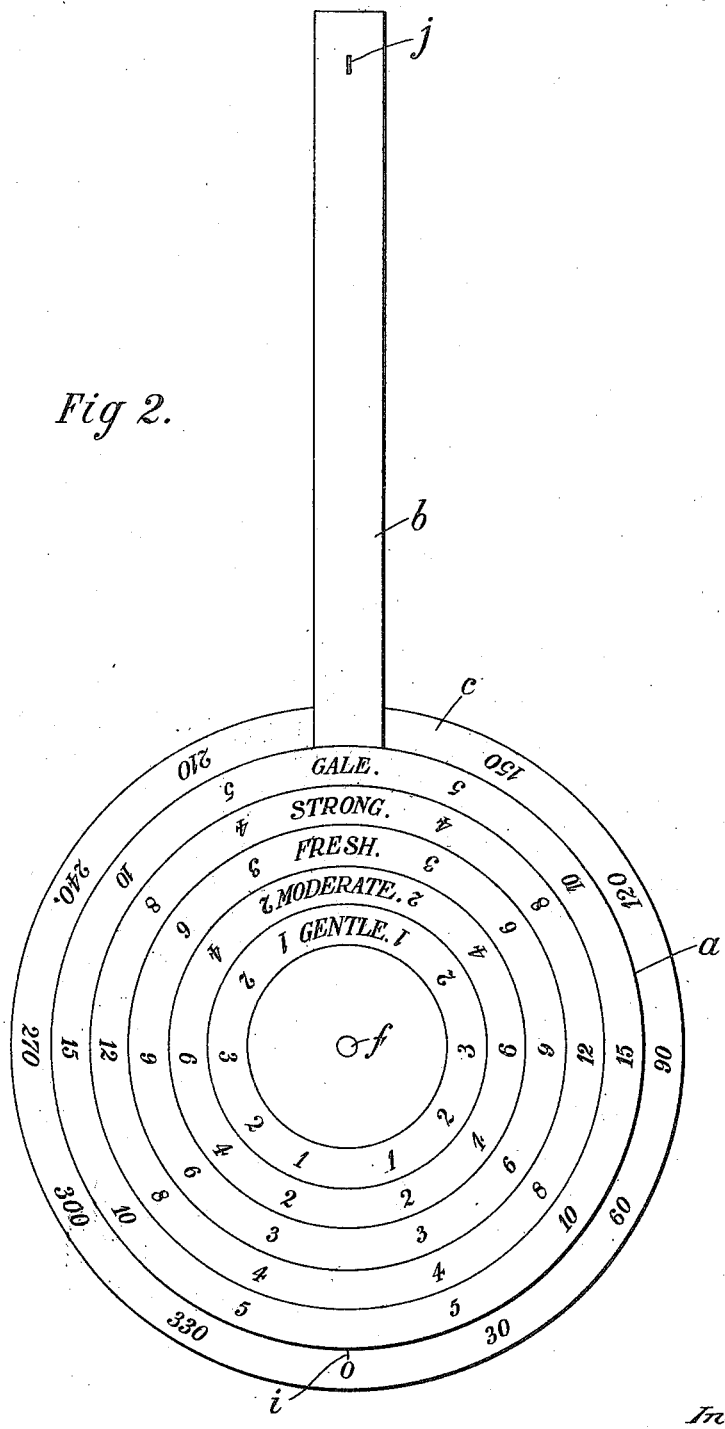

Figure 1 is a partial side elevation of an instrument made in accordance with the present invention; and Fig. 2 is a plan view of the dials and straight arm, the flag and flagstaff and the tail piece being removed for the sake of clearness.

As shown the improved device comprises a graduated deflection dial $a$ which is fixed to a straight arm $b$ which is angularly adjustable about a center pivot in relation to a stationary and graduated circle or base plate $c$ which is set by means of a compass with its zero to the north point in order that bearings may be set. A flagstaff $d$, carrying a flag $e$, is held in a socket $f$ in the center of the deflection dial $a$. This flagstaff also carries or supports a tailpiece or weathercock vane $g$ and a graduated quadrant or quarter circle $h$.

Starting from the flagstaff $d$ the words Gentle, Moderate, Fresh, Strong and Gale are written on the quarter circle shape $h$, and they indicate the strength of the wind when the tip of the flag is blown out to them. A pointer $i$ is provided for setting the straight arm $b$ to any required figure on the compass dial $c$. Similar words indicating the wind strength are also written on the deflection dial $a$ as shown and the number of minutes of deflection per 1,000 yards range according to the direction of the wind are written in the circles and are indicated by the front extension or pointer $h'$ of the weathercock $g$ $h$. This deflection will of course vary for each different kind of gun or rifle, the particular set of figures given being for a 12 pounder field gun. A foresight $j$ is provided as shown for sighting the straight arm $b$ on the target.

In using the improved device for a future target the pointer $i$ is set to the same angle of the graduated circle $c$ as that ordered for the guns. For a stationary object the foresight $j$ is sighted on the target. The flag $e$ indicating the strength of the wind is for the sake of example assumed to be pointing to "Fresh." On the deflection dial $a$ the figures in the circle marked "Fresh" are the figures in this case to notice. The weathercock now swings over the deflection dial $a$ and in indicating the direction of the wind, its pointer $h'$ points to the number of minutes in the "Fresh" circle, which for artillery are multiplied by the thousands of yards distance of the target thus:—If the pointer points to 7 and the distance of the target is 5,000 yards the deflection for that particular target is 35 minutes right or left as the case may be.

To obtain the deflection for infantry the figures in the circles may be such that they can be multiplied by the hundreds of yards distance of the target.

What I claim is:—

1. A device of the class described comprising a pivoted weather vane having one edge cut to form a quarter of a circle and provided adjacent the said edge with wind indicating data, a staff on which the weather vane is pivotally mounted, and a flag secured to the upper end of the staff, said flag being of such length that its lower end will float adjacent the curved edge of the weather vane to coöperate with the data thereon to visually indicate the state of the wind.

2. A device of the class described comprising a pivoted weather vane having one edge cut to form a quarter of a circle and provided adjacent the said edge with wind indicating data, a staff on which the weather vane is pivotally mounted, a flag secured to the upper end of the staff, and a pivoted base formed with a plurality of concentrically arranged circles and data corresponding to the data adjacent the circular edge of the weather vane, said pivoted base having a pointer by which the device may be set with reference to a compass.

3. A device of the character described comprising a fixed base, a rotatable base mounted above the fixed base and provided with a plurality of concentrically arranged circles with indicating data therebetween and with degree indicating characters, said rotatable base having an extension formed with a sighting device, a compass pointer at the opposite end of the rotating base, a staff extending upwardly from the fixed base and through the rotatable base, a weather vane mounted on the staff, one edge of the weather vane being cut to form approximately a quarter circle, weather indicating data adjacent the circular edge, and a flag on the staff, said flag being of such length that its lower corner will float adjacent the circular edge of the weather vane to indicate by the data thereon the state of the wind.

In testimony whereof I have hereunto signed my name.

FREDERICK ARCHER HANKS.

Copies of this patent may be obtained for five cents each, by addressing the "Commissioner of Patents, Washington, D. C."